Patented Sept. 26, 1939

2,174,177

UNITED STATES PATENT OFFICE 2,174,177

PROCESSES OF PRODUCING AN ADSORBENT AGENT

Henry R. Kraybill, Pearl H. Brewer, and Max Horsley Thornton, West Lafayette, Ind., assignors to Purdue Research Foundation, West Lafayette, Ind., a corporation of Indiana No Drawing. Application January 21, 1937, Serial No. 121,572

2 Claims. (Cl. 252—2)

Our invention relates to an adsorbent agent, and the process of producing it.

Such an adsorbent agent is desirable for removing various kinds of substances from liquids containing them; as, for instance, in removing phosphatides, mucilages, sterols, pigments, and associated substances from vegetable oils and vegetable-oil sludges containing them, and in refining vegetable oils and reconditioning used mineral oils.

In carrying out our invention, we treat a water solution of sodium silicate (water glass) with an aqueous solution of an acid-reacting aluminum salt, such as aluminum chloride or aluminum sulfate or aluminum nitrate, and mix thoroughly. Preferably we run a quantity of carbon dioxide into the sodium-silicate solution before adding the aluminum salt; but this is not necessary, and if it is done it is stopped short of causing the formation of a gel. When the aluminum salt is added, it produces a gelatinous precipitate, but does not convert the mass into a rigid gel. The nature of the precipitate depends to a large extent upon the specific gravity of the water glass—or the extent to which it is diluted—for within limits an increase in the amount of water increases the hardness and the density and decreases both the volume and the effectiveness of the final product, so that the amount of water present at this time is kept sufficiently small so that almost but not quite all of the water is taken up in the precipitate.

Immediately after the precipitate has been formed as aforesaid, we add more water, and stir well, and then preferably allow the whole to stand over night or longer; and in this addition of water make certain that there is enough of it added to prevent the mass from forming a rigid gel on so standing. We then filter to remove excess liquid; which leaves a white precipitate. This is washed thoroughly with water, and dried at a temperature of about 100° C. The dried material is quite friable, which facilitates its being rubbed into a powder form, in which it is preferable to use it.

This powder, of any desired coarseness or fineness, may be used effectively as an adsorbent agent, to remove various materials from liquids. Our material is excellent for many types of adsorptions. A most important one is the adsorption of certain phosphatides, mucilages, sterols, and pigments and associated compounds from vegetable oils. Others are the refining of vegetable oils and the reconditioning of used mineral oils. A most convenient way for using it for these purposes is to use it as a medium through which the oil to be treated is passed as through a filter.

Our material is fairly light in weight, white in color, porous in texture, and very friable.

The proportions which we may use in preparing our material may vary quite considerably. An example is as follows:

Example 587.5 cc. of water glass of 1.188 specific gravity is diluted to the desired extent by adding water to it. The amount of water added depends upon the hardness desired for the ultimate material; for the greater the amount of water which is added, within limits, the greater will be such hardness. For instance, if the dilution with water is to about 650 cc. the final material will be quite soft; if it is to about 1050 cc. the final material will be of intermediate hardness; and if it is to 2050 cc. the final material will be quite hard.

Carbon dioxide is now preferably run into this sodium-silicate solution, desirably until the solution becomes slightly opaque and is almost to the point of forming a gel—indeed, a little gel may be allowed to form at the edges, but the carbon dioxide should be stopped short of causing the whole mass to gel. If desired, however, this step of running in carbon dioxide may be omitted.

Whether or not the carbon-dioxide step is used, we now add about 300 cc. of a 20% aqueous solution of aluminum chloride (or molecular equivalents of aluminum sulfate or aluminum nitrate). The aluminum chloride is $AlCl_3.6H_2O$. The two solutions are mixed thoroughly, and a gelatinous precipitate is formed.

Water is added to this precipitate before the whole mass has time to form a gel, and the mass is well stirred; and then desirably the mass is allowed to stand, say for 24 hours or even longer for best results. The amount of water added is sufficient to prevent the mass from forming a gel on such standing—say half a liter or a liter or even more. Excess water is finally removed by filtration.

The solid residue or precipitate thus formed is washed thoroughly with distilled water, and dried in an air oven at about 100° C. The dried material is white, porous, and quite friable. This dried material, crushed to any desired fineness, is ready for use as an adsorbent material.

We claim as our invention:

1. The process of making an adsorbent agent, which consists in mixing a water solution of sodium silicate with a water solution of an acideacting aluminum salt, to form a gelatinous precipitate, and using solutions of such concentration and keeping the amount of water present prior to the formation of said gelatinous precipitate sufficiently small that almost but not quite all of it is taken up in the precipitate, mixing said precipitate before the mass has time to form a gel with additional water in sufficient quantity to prevent the whole from forming a gel on standing, then letting the whole stand, filtering to remove excess water, and drying.

2. The process of making an adsorbent agent, which consists in passing carbon dioxide into a water solution of sodium silicate in an amount which is insufficient to cause the formation of a gel, mixing with the resultant product a water solution of an acid-reacting aluminum salt, to form a gelatinous precipitate, and using solutions of such concentration and keeping the amount of water present prior to the formation of said gelatinous precipitate sufficiently small that almost but not quite all of it is taken up in the precipitate, immediately mixing said precipitate on its formation with additional water in sufficient quantity to prevent the whole from forming a gel on standing, then letting the whole stand, filtering to remove excess water, and drying.

HENRY R. KRAYBILL.
PEARL H. BREWER.
MAX HORSLEY THORNTON.